Patented May 27, 1930

UNITED STATES PATENT OFFICE 1,760,769

WILHELM NEELMEIER, OF LEVERKUSEN, NEAR COLOGNE-ON-THE-RHINE, AND THEODOR NOCKEN, OF WIESDORF, NEAR COLOGNE-ON-THE-RHINE, GERMANY, ASSIGNORS TO GENERAL ANILINE WORKS, INC., OF NEW YORK, N. Y., A CORPORATION OF DELAWARE

VAT DYESTUFFS OF THE INDIGOID SERIES

No Drawing. Application filed March 25, 1927, Serial No. 178,495, and in Germany April 3, 1926.

The present invention relates to the production of new vat dyestuffs, resulting from the condensation of a thio ether of a 1-hydroxy-4-mercapto compound of the following formula:—

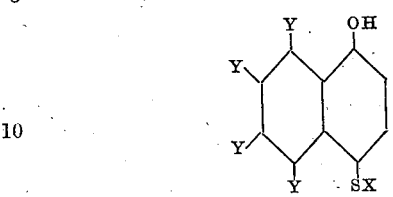

in which X represents an alkyl, aralkyl or aryl group and Y represents hydrogen which may be substituted by an halogen or an alkyl group, with such an isatin body of the general formula:—

wherein R represents an aryl residue which may contain further substituents and $R_1$ represents a halogen group or an arylide group or the like, as is suitable for the condensation of an indigoid dyestuff.

Our new dyestuffs give very bright shades and are of excellent fastness to light. From organic solvents they crystallize mostly in the form of needles possessing a metallic luster. They are soluble in pyridine with a blue to green coloration and yield with alkaline hydrosulfite yellow to orange vats, from which they dye vegetable fibres blue to green shades. Our new dyestuffs are distinguished from dyestuffs derived from alkyl or aryl ethers of 1.4-dihydroxy-naphthalene by their more greenish-blue to green shades and better fastness to light. The general formula of our dyestuffs is:—

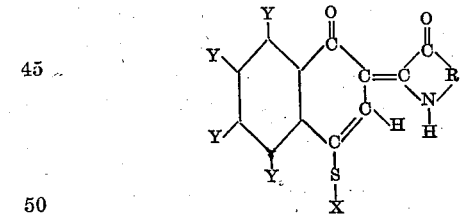

in which X represents an alkyl, aralkyl or aryl group, Y represents hydrogen which may be substituted by an halogen or an aryl group, and R represents an aryl residue which may contain further substituents, preferably halogen atoms.

To further illustrate our invention the following example is given:—

*Example 1.*—190 parts by weight of the monomethyl thio ether of 4-mercapto-1-hydroxynaphthalene (Ber. 48, page 128) are dissolved in 2000 parts by weight of benzene and condensed with the di-bromo-isatinchloride prepared in the customary manner, from 305 parts by weight of 5.7-dibromisatin and 230 parts by weight of phosphorous pentachloride in chlorbenzene solution. After a short time the dyestuff crystallizes out. It is soluble with difficulty in sulfuric acid, more readily soluble in pyridine with a bluish-green coloration and dyes the fiber from the yellow alkaline hydrosulfite vat in clear and fast greenish-blue shades. Our dyestuff has probably the following formula:—

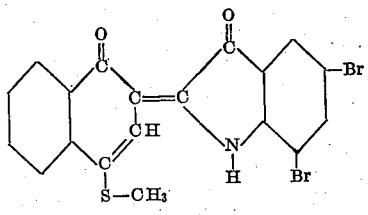

*Example 2.*—266 parts by weight of the mono-p-tolyl thio ether of 4-mercapto-1-naphthol (prepared from alphanaphthol and p-tolyl-sulfur chloride according to Zincke and Farr, annalen 391, page 63) is condensed with the equivalent amount of 5.7-dibromisatinchloride, in the manner described in Example 1. The dyestuff crystallizes from chlorbenzene in the form of needles possessing a bronze luster. The new dyestuff dyes cotton from the alkaline hydrosulfite vat in very greenish-blue shades. It has most probably the following formula:—

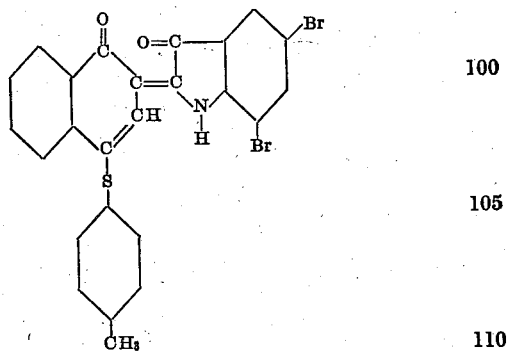

Another very good dyestuff is obtained from 4-ethyl-mercapto-1-naphthol by condensation with 1-chlor-brom-2.3-naphthisatin, which has probably the following formula:

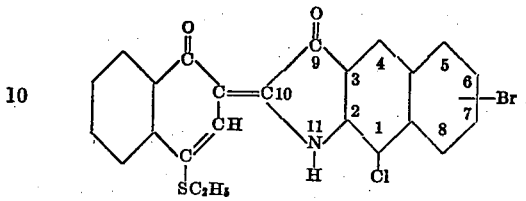

The naphthisatin may be obtained by brominating according to the usual method 1-chloro-2, 3-naphthisatin. It is a red crystalline powder melting at about 313° C. (compare D. R. P. 273,536, Friedl. XI, 309).

The orientation of the bromine atom is not definitely known. This dyestuff yields a very bright greenish shade especially fast to light.

We claim:—

1. As new compounds vat dyestuffs, having most probably the general formula:—

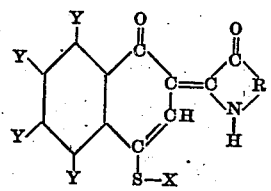

in which X represents an alkyl, aralkyl or aryl group, Y represents hydrogen which may be substituted by an halogen or by an alkyl group, and R represents an aryl residue which may contain further substituents; which dyestuffs are, when dry, powders having a metallic luster yielding with alkaline hydrosulfite a yellow to orange vat from which fibres are dyed in blue-green to greenish shades of excellent fastness especially to light, and which are substantially identical with the dyestuffs obtainable by condensing with an isatin body a thio ether of a 4-mercapto-1-naphthol compound corresponding most probably to the formula—

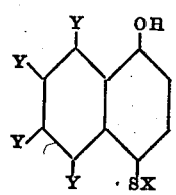

wherein X represents an alkyl, aralkyl or aryl group, and Y represents hydrogen which may be substituted by an halogen or by an alkyl group.

2. As new compounds vat dyestuffs corresponding probably to the following formula:—

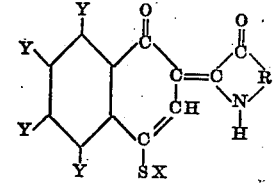

in which X represents alkyl and Y represents an hydrogen which may be substituted by an halogen or alkyl group, which dyestuffs are, when dried, powders having a metallic luster, yielding with alkaline hydrosulfite a yellow to orange vat from which fibres are dyed full bluish-green to green shades of excellent fastness especially to light, said dyestuffs being substantially identical with the dyestuffs obtainable by condensing an isatin chloride with an alkyl thio ether of a 4-mercapto-1-hydroxy-naphthalene compound having the general formula:—

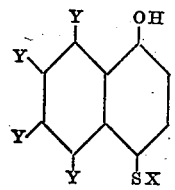

in which X represents an alkyl and Y represents hydrogen which may be substituted by an halogen or an alkyl group.

3. A new vat dyestuff corresponding probably to the following formula:—

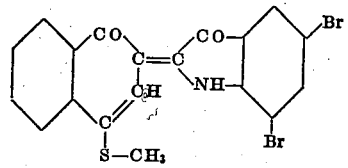

which dyestuff is, when dried, a powder having a metallic luster, being difficultly soluble in concentrated sulfuric acid, but soluble in pyridine with a bluish-green coloration, yielding with alkaline hydrosulfite a yellow vat from which vegetable fibres are dyed full bluish-green shades of excellent fastness to light, said dyestuff being substantially identical with the dyestuff obtainable by condensing the mono-methyl thio ether of 4-mercapto-1-hydroxy-naphthol with 5.7-dibromisatinchloride.

In testimony whereof, we affix our signatures.

WILHELM NEELMEIER.
THEODOR NOCKEN.